US007628935B2

(12) United States Patent
Naciri et al.

(10) Patent No.: US 7,628,935 B2
(45) Date of Patent: Dec. 8, 2009

(54) CONTROLLED ACTUATED MEMBRANES AND METHODS OF MAKING SAME

(75) Inventors: Jawad Naciri, Herndon, VA (US); Christopher M Spillmann, Alexandria, VA (US); Jonathan Selinger, Hudson, OH (US); Banahalli R Ratna, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 153 days.

(21) Appl. No.: 11/553,305

(22) Filed: Oct. 26, 2006

(65) Prior Publication Data

US 2007/0108407 A1 May 17, 2007

Related U.S. Application Data

(60) Provisional application No. 60/730,154, filed on Oct. 26, 2005.

(51) Int. Cl.
  *C09K 19/00* (2006.01)
  *C09K 19/06* (2006.01)
  *C09K 19/52* (2006.01)
(52) U.S. Cl. .............................. 252/299.01; 252/299.6; 428/1.1; 430/20; 430/270.1
(58) Field of Classification Search ............ 252/299.01, 252/299.6; 430/20, 270.1; 428/1.1
See application file for complete search history.

(56) References Cited

U.S. PATENT DOCUMENTS

| 6,030,668 | A | 2/2000 | Hall et al. |
| 6,294,109 | B1 | 9/2001 | Ratna et al. |
| 7,122,229 | B1 * | 10/2006 | Camacho-Lopez et al. ... 428/1.1 |
| 2006/0041061 | A1 | 2/2006 | Naciri et al. |

OTHER PUBLICATIONS

Lehmann, W., et al., Giant lateral electrostriction in ferroelectric liquid-crystalline elastomers, Nature 410, 447, 2001.

D.L. Thomsen, III, P. Keller, J. Naciri et al., Liquid crystal elastomers with mechanical properties of a muscle. *Macromolecules* 34 (2001), pp. 5868-5875.

Garoff et al, Reply to "Behavior of electric susceptibility and electroclinic coefficient near the chiral smectic $A$-$C^*$ transition" R.B. Physical Review A 18, 2739, 1978.

Kohler et al., Electroclinic effect in free-standing smectic elastomer films, . Appl. Phys. A- Mater. Sci. & Proc. 80, 381, 2005.

Naciri et al, Room Temperature Ferroelectric Terpolymers with Large Spontaneous Polarization, Macromolecules, 1995, 28, 5274-5279.

Naciri, et al, Fast switching ferroelectric side-chain liquid-crystalline polymer and copolymer, Liq. Cryst. 1991, 10 (4), 585.

Lee and Patel, Nonlinear behavior of the field-induced molecular tilt near the smectic $A$-$C^*$ transition, App. Phys. Lett., 54, 1653, 1989.

Camacho-Lopez, et al., Fast liquid-crystal elastomer swims into the dark, Nature, vol. 3, p. 307, May 2004.

Nishikawa, Smectic-$A$ liquid single crystal elastomers—strain induced break-down of smectic layers, *Macromol. Chem. Phys.* 200, 312-322 (1999).

Hamelinck, et al., Homeotropic alignment on surface-initiated liquid crystalline polymer brushes, J. Mater. Chem., 2005, 15, 381-385.

P. E. Cladis, Liquid Crystalline Elastomers as Artificial Muscles, Dynamic Control Systems Proceedings, Processes, Arde Guran (ed) (2000).

Yoseph Bar-Cohen, Electroactive Polymers as Arti. cial Muscles: A Review, Journal of Spacecraft and Rockets vol. 39, No. 6, Nov.-Dec. 2002.

Nishikawa,et al., Smectic A liquid single crystal elastomers showing macroscopic in-plane fluidity, Macromol. Rapid Commun. 18,65-71 (1997).

* cited by examiner

*Primary Examiner*—Geraldina Visconti
(74) *Attorney, Agent, or Firm*—John J Karasek; Amy Ressing

(57) ABSTRACT

The invention describes shape changing membranes that can be precisely controlled using the unique approach of smectic liquid-crystalline elastomers (LCEs) with patterned electrodes and a process of preparing and creating the elastomers. The methods to create the shape changing membranes is based on the electroclinic effect of smectic layers in a polymer network and provides a novel material for actuators.

42 Claims, 6 Drawing Sheets

CONTROLLED ACTUATED MEMBRANES AND METHODS OF MAKING SAME

CROSS-REFERENCE TO RELATED APPLICATIONS

This Application is a Non-Prov of Prov (35 USC 119(e)) application 60/730,154 filed on Oct. 26, 2005, incorporated herein in full by reference.

BACKGROUND OF THE INVENTION

Materials that can be electrically actuated are based on a variety of physical responses of the polymer to an applied voltage. These materials include dielectric elastomers, ferroelectric polymers, and conducting polymers. Materials with fast response times and high strains at relatively low applied voltages would be useful. Liquid crystal elastomers (LCEs), which incorporate the anisotropy of liquid crystal molecules, produce reversible macroscopic shape changes under thermal or optical stimulation. Nanometer-scale voltage-induced actuation has been demonstrated in a smectic elastomer.

New high performance actuator materials capable of generating large mechanical actuation induced by external stimuli such as electric field and temperature are needed for a wide range of applications from MEMS to robotics. Materials with high strain levels coupled with high energy density are needed for these applications. Supramolecular ordered assemblies such as liquid crystals provide an excellent framework for incorporating anisotropy as well as functionalities in materials that respond to external stimuli. Nematic liquid crystal elastomers have been extensively studied in the past. These materials undergo macroscopic form change as a result of the order-disorder transition of the mesogens.) This effect could form the basis of an artificial muscle (see de Gennes, et al, Macromol. Symp. 113, 39 (1997) and Thomsen et al., Macromol. 34, 5868 (2001). In the case of these elastomers, a temperature driven phase transition from nematic phase to isotropic phase causes a uniaxial contraction of the elastomer. On heating the film, a remarkable contraction of up to a factor of 4 occurs in the isotropic state. Despite this, these materials suffer from slow thermoelastic response due to the inherently low thermal and electrical conductivity of the elastomer.

The theoretical mechanism for shape changes in liquid-crystalline elastomers is based on a coupling between the orientational order of the mesogenic groups and distortions of the crosslinked polymer network. Because of this coupling, any changes in the magnitude or direction of the orientational order affect the macroscopic shape of the elastomer and, conversely, any distortions in the shape of the elastomer affect the orientational order of the mesogenic groups (see Warner, et al, Liquid Crystal Elastomers, Oxford University Press, 2003). In particular, the polymer network tends to extend along the direction of orientational order, and to contract in the two transverse directions.

An alternative approach is to use liquid crystalline elastomers that exhibit chiral smectic A (electroclinic) phase. Garoff et al, R.B. Physical Review A 18, 2739, 1978, first demonstrated that when an electric field is applied to a smectic A liquid crystal composed of chiral molecules along the layer plane, the transverse dipole of the molecules couple to the electric field and tilt the molecules in a plane perpendicular to the electric field direction. This field-induced tilting of molecules is known as the electroclinic effect. It is also referred to as the "soft mode" in analogy with the softening of a vibration mode near the paraelectric-ferroelecric transition in solid ferroelectrics like barium titanate. The electroclinic effect and the induced tilt angle $\theta$ of the molecules increases continuously with the field. The tilt leads to a layer contraction $\Delta l$ proportional to $(1-\cos\theta)$ which cumulatively should result in a macroscopic contraction of the sample in a direction perpendicular to the smectic layers and a concomitant extension parallel to the smectic layers. The extension is expected to scale with a $\sin\theta$ dependence on the tilt angle. Lehmann et al. [Lehmann, et al. Nature, 410, 447, 2001] demonstrated that the thickness of a freely suspended ultra-thin (less than 100 nm thick) electroclinic elastomer film indeed decreases due to the layer contraction.

The advantage of the elecroclinic approach is that electric fields can be used to induce shape variation based on the electroclinic effect. Moreover, these materials require low switching voltages and exhibit fast switching speed at 2-3 orders of magnitude faster compared to nematic elastomers. An application of an electric field parallel to the smectic layers induces a tilt $\theta$ of the mesogens that varies continuously with field. This tilt leads to a contraction of the sample perpendicular to the smectic layers and an elongation parallel to the smectic layers.

The layer contraction and film extension may be understood from geometrical considerations, because the change in layer spacing, $\Delta l$, is proportional to the cosine of the tilt angle $\theta$ while the extension is proportional to the sine of the tilt angle (FIG. 1). The degree of contraction and extension of the elastomers is proportional to the magnitude of the electroclinic tilt. Note that this distortion depends on the sign of the applied electric field; reversing the sign of the field inverts the shape of the distortion.

While there have been quite a few investigations on the mechanical properties of nematic elastomers, the mechanical properties of chiral smectic A elastomers has been studied much less. Recently, ferroelectric liquid crystal elastomers showing actuation under an applied electric field have been demonstrated. Lehmann et al. [Nature 410, 447, 2001] and Kohler et al. [Appl. Phys. A-Mater. Sci. & Proc. 80, 381, 2005] showed an electrostriction of an ultra-thin film (less than 100 nanometers) that exhibits up to a 4% strain. In both of these studies, the ultra thin membranes were not practical for use as shape changing membranes for several reasons. First, the thickness of the films makes them extremely difficult to prepare and handle in any other setup than the specific experimental method they describe, thus severely limiting their use outside of the specific method they employ. Second, the orientation of the films, which were prepared with the liquid crystal molecules in homeotropic alignment in reference to the electrodes, will not function as an actuator for practical applications since the contractile strain occurs across the film thickness. In addition, the preparation the elastomer films rendered the film thickness non-uniform, thus creating non-uniform strains throughout the film when subjected to applied fields. Finally, preparation of the films imposed strict limitations on the manner in which the solid electrodes were positioned and attached to the film. Since the electrodes must be positioned at the edge of the homeotropically aligned film, it is not amenable to patterning or scaling. Introduction of flexible electrodes is also not possible with the experimental setup they describe. Due to the film preparation in these studies, the limitations in the position of the electrodes with respect to the film introduced large gradients, inhomogeneities, and fluctuations in the electric field applied to the films. It is apparent from the experimental design that non-obvious changes in the operation and preparation of the films must be introduced in order to reduce the electric actuation of the films to practice.

Thus there is a need in the art for new high performance actuator materials capable of generating large mechanical actuation induced by external stimuli. These materials need to be precisely controlled. These and other needs are met by the present invention.

BRIEF SUMMARY OF THE INVENTION

The invention describes shape changing membranes that can be precisely controlled using the unique approach of smectic liquid-crystalline elastomers (LCEs) with patterned electrodes and a method of preparing the elastomers. The methods to create the shape changing membranes is based on the electroclinic effect of smectic layers in a polymer network and provides a novel material for actuators. Provided for is a shape changing membrane comprising at least one liquid crystal elastomer film, said elastomer film having a chiral smectic A phase and a planar orientation; and at least one stimuli, said stimuli being operable on said film. The liquid crystal elastomer film is comprised of at least one liquid crystal mesogen comprising a polymerizable group and a flexible spacer; and a crosslinker. The polymizable groups form a polymer backbone, including, but not limited to, a polyacrylate, polysiloxane or polynorbornene backbones.

Also provided is a method of making a shape changing membrane where a first liquid crystal mesogen comprising a polymerizable group and a flexible spacer, a second liquid crystal mesogen comprising a polymerizable group and a flexible spacer and a crosslinker are combined to form a mixture. The membrane is aligned in a planar alignment. A polymerization catalyst is added to the mixture. The mixture is polymerized, and a membrane is formed.

Also provided for is a method of making a shape changing membrane from a copolymer by mixing a polymer backbone having a liquid crystal mesogen side chain, a flexible spacer and an polymerizable group and adding a crosslinker and a polymerization catalyst to the mixture. The mixture is aligned in a planar alignment, then polymerized. The membrane is formed from the polymerized copolymer. Alternatively, the copolymer can be formed by mixing a siloxane backbone having a liquid crystal mesogen side chain, a flexible spacer and a vinyl group with a crosslinker having a vinyl group and an acrylate group with a thermal polymerization catalyst. A second polymerization catalyst is added to the copolymer. The copolymer is aligned in a planar alignment and polymerized. The membrane is formed from the polymerized copolymer.

DETAILED DESCRIPTION OF THE INVENTION

This invention provides a unique process of generating shape changes under an applied electric field. The freestanding film exhibits anisotropic actuation and shows fast and reversible shape change under an applied electric field. The magnitude of the field applied is at least three times lower than electrostrictive polymers. The invention provides wide ranges of applications that could incorporate shape changing membranes. These include, but are not limited to, applications in robotics, microfluidics, and deformable fins for autonomous underwater vehicles.

Figure 1:
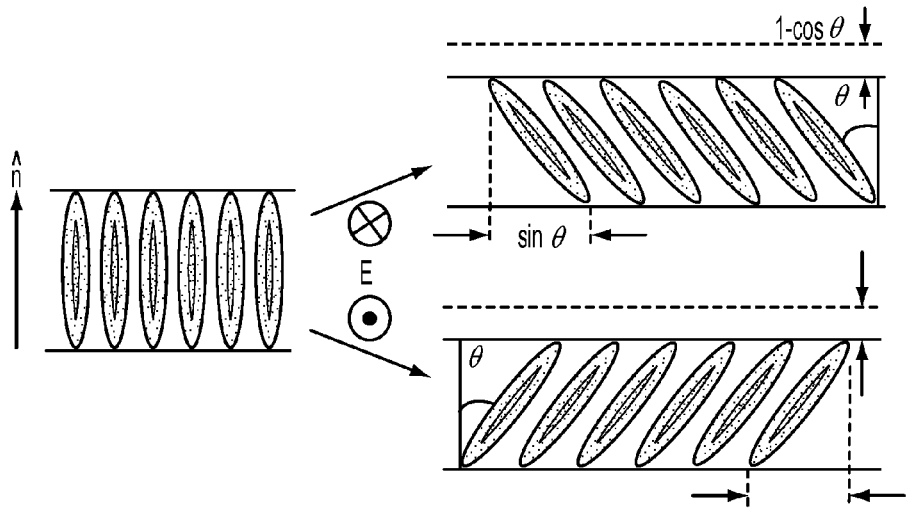
FIG. 1 is a schematic of the electroclinic effect of a chiral smectic A liquid crystal molecule.
Figure 2:
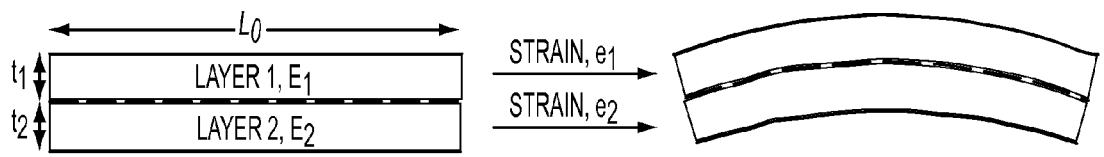
FIG. 2 is a schematic of a bi-material strip.

FIG. 1 is a schematic of the electroclinic effect of a chiral smectic A liquid crystal molecule. In order to generate complex shape changing membranes that can be precisely controlled, composite layers are prepared having two distinct types of material, which produce different strains in response to an applied electric field. These composite films can be considered as "bi-material strips," in analogy with the bimetallic strips in thermostats. Two pieces of material are joined together, with thickness $t_1$ and $t_2$, respectively. Initially they are both flat with length $L_0$. An electric field is applied (or some other physical change is applied) so that the two materials have strains $e_1$ and $e_2$, respectively. The bi-material strip responds in two ways. It changes its strain along the middle line, and it bends with a curvature radius, r. Therefore, it can be shown that due to the incompatibility between the strains, an applied electric field will induce a curvature, as shown in FIG. 2.

A calculation based on minimization of the elastic energy of the bi-material strip gives the following expression for the curvature:

$$\frac{1}{r} = \frac{6E_1E_2(e_2 - e_1)t_1t_2(t_1 + t_2)}{E_1^2t_1^4 + E_2^2t_2^4 + 2E_1E_2t_1t_2(2t_1^2 + 3t_1t_2 + 2t_2^2)},$$

where $E_1$ and $E_2$ are the elastic moduli, $e_1$ and $e_2$ are the favored strains, and $t_1$ and $t_2$ are the thicknesses of the two layers, respectively. For example, if the elastic moduli are equal, the thicknesses are both 20 μm, and the favored strains are $e_1=0$ and $e_2=0.015$, then the radius of curvature is r=1.8 mm. Hence, the strip should curl into a half-circle if it has the length L=πr=5.5 mm.

Figure 3:
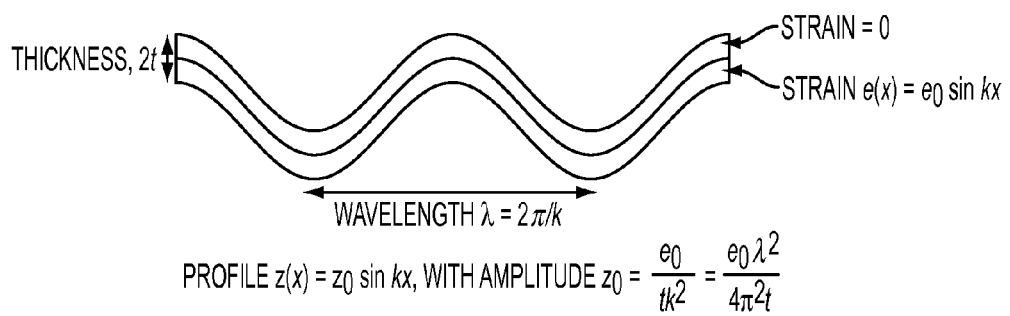
FIG. 3 is a schematic of corrugation of a bi-material strip.

The curvature of a bi-material strip can be made into more complex shapes by applying an electrode array across the length of an electrically actuated material. With such a design it is possible to produce shape changes that resemble two-dimensional waveforms, such as the corrugation shown in FIG. 3. As an example of how corrugation of an actuator is possible, consider the following. If the actuating material depicted in FIG. 3 is capable of producing a strain of 1% ($e_0=0.01$) and the actuation is patterned by an electrode array to provide a wavelength of 10 cm, an amplitude, $z_0$, of 5 cm will be produced given each layer is 50 μm thick.

Figure 4:
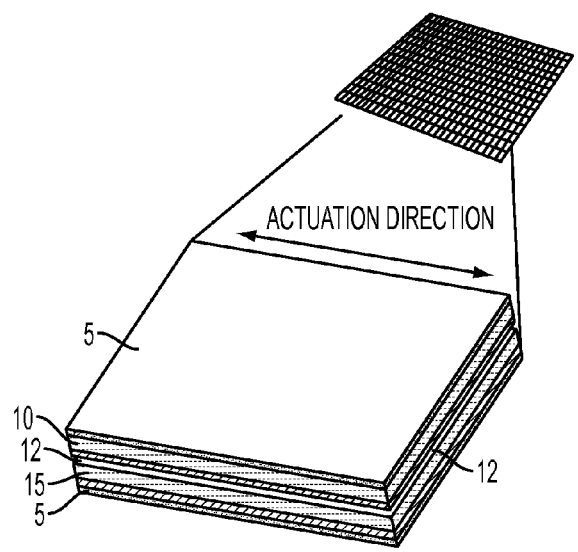
FIG. 4 is a schematic representation of an electrically-induced actuator confined between patterned electrodes.
Figure 5:
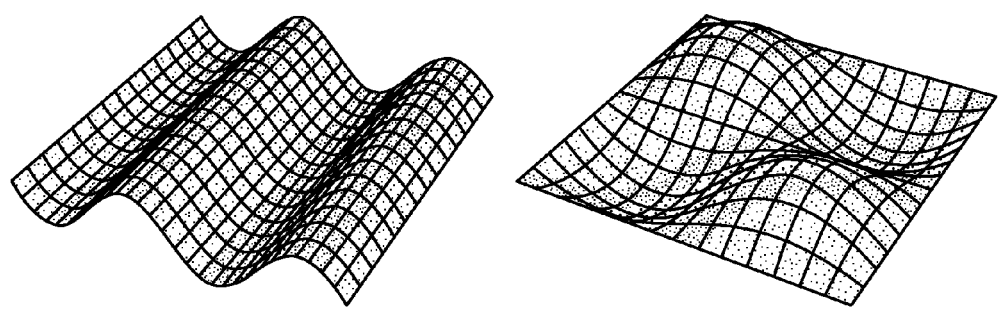
FIG. 5 is two simulations demonstrating shape changing using electrode arrays.

For detailed control of the shape, actuators designed into sheets of material can be prepared with electrode arrays on the top and bottom surfaces. These arrays can apply patterned electric fields, which will induce patterned strains over the surface of the actuator. One design of an electrically actuated shape changing membrane is schematically represented in FIG. 4, where two elastomer films are confined between three electrodes. A patterned electrode layer 12 is located between a first liquid crystal elastomer layer 10 and a second liquid crystal elastomer layer 15. A support layer 5 with uniform conformal electrode coating is located on the top of the first and bottom of the second liquid crystal elastomer layer. For example, an electric field can be applied that varies sinusoidally in the x direction, or sinusoidally in both the x and y directions. In order to accomplish this with the electroclinic elastomer films, alternating layers of elastomer are oriented perpendicular to one another to take advantage of the anisotropic response of the material in both the x and y directions. Thus, the electroclinic response described in FIG. 1 would be enabled in both directions in order to produce more complex distortions, such as those modeled in FIG. 5. These shapes can vary dynamically as the applied electric field is modulated.

FIG. 4 shows the detailed structural design of one example of a shape changing membrane with a protective coating, patterned electrodes, and layers of electrically actuated material. Two electrodes are used to actuate a single film so for a shape changing membrane made of n films, n+1 electrodes would be used to render the films as dynamically active materials. In addition, the anisotropic response of the electroclinic elastomer can be fully exploited by alternating the orientation of each successive film layer such that it is positioned orthogonal to the previous film. This design would allow for macroscopic contraction in both the x and y direction.

Figure 6:
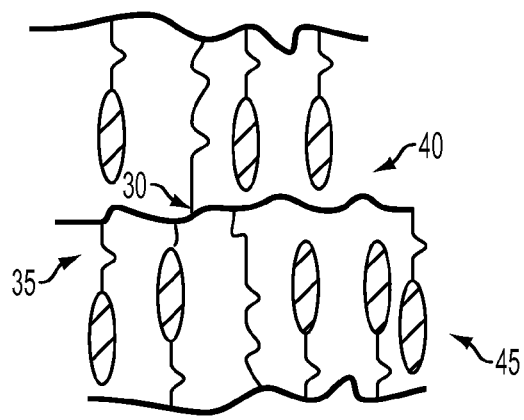
FIG. 6 is a schematic of the composition of a liquid crystal elastomer.

A schematic representation of the elastomer is shown in FIG. 6. The material used to create the shape changing membranes consists of liquid crystal mesogens 45, attached in a comb-like fashion, to a polymer backbone 40 via flexible spacers 35. The resulting side-chain may then be cross-linked 30 to yield a liquid crystalline elastomer.

The mesogenic side group consists of an aromatic rigid central core connected to two flexible hydrocarbon chains. One of the chains contains a chiral center. The synthesis of these types of molecules is taught by Ratna, et al, U.S. Pat. No. 6,294,109, incorporated herein in full by reference. However, the molecules described in Ratna are low molecular mass monomers. To prepare the elastomers used to create the shape changing membrane material of the present invention, the synthesis method used in Ratna, et al, needs to be modified to include acrylate end groups needed for photopolymerization. The structures of LC molecules and the cross-linker molecules are:

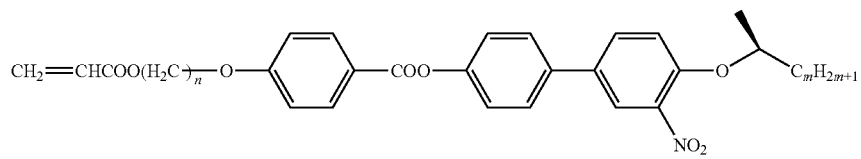

LC molecule ACKNnm, where n=4-12 and m=5-6.

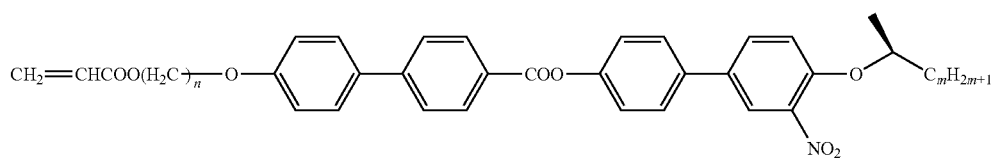

LC molecule ACBKNm, where n=4-12 and n=5-6.

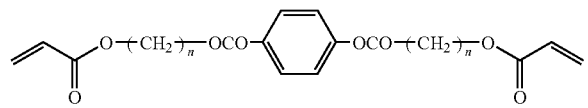

Cross-linker DACP11, where n=4-14.

These molecules are only examples of mesogens that could be incorporated an elastomer film and used for shape changing membranes. In more general terms, any chiral liquid crystal molecule that also has a smectic A phase is a candidate for incorporation into an elastomer film.

Those skilled in the art would understand that other backbones, such as polysiloxane or polynorbornene, and other cross-linkers could be used. In addition, mesogens that incorporate a siloxane unit in the spacer could be used as the liquid crystal components of the elastomer film. An example of LC molecules with a siloxane spacer is:

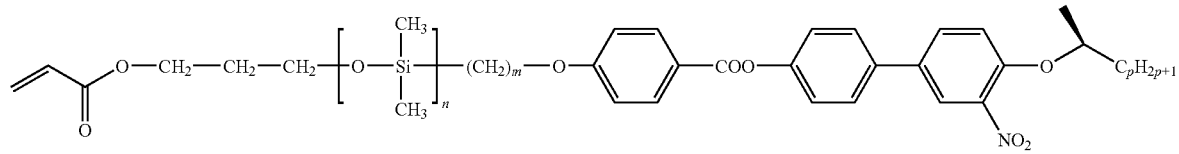

where n=1-3, m=3-8 and p=5-6.

For the crosslinker, the protecting group methyl chloroformate can easily be cleaved in order to introduce the acrylate polymerizable group as shown in the structure below. Those skilled in the art would understand that the protecting group (methyl chloroformate) is one of many protecting groups that could be used.

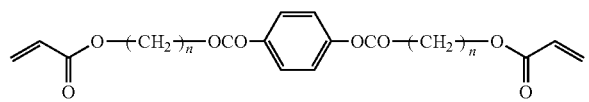

wherein n is from 4 to 14.

Alternatively, the shape changing membrane can be prepared from a copolymer by cross-linking a polymer backbone comprised of at least one liquid crystal mesogen side chain and a second side chain containing a polymerizable group by adding a polymerization catalyst to the mixture. The mixture can be aligned in a planar alignment via several techniques including, but not limited to, use of rubbed surfaces, spin-casting, and/or mechanical shearing and then finally cross-linked. As an alternative, the copolymer can also be formed by reacting a siloxane backbone, a liquid crystal mesogen side chain with a terminated vinyl group, a cross-linker with a vinyl group on one side and an acrylate group on the side, and a thermal polymerization catalyst. Once the copolymer is formed, a second catalyst is added and the material is aligned in a planar alignment and cross-linked to form the membrane. Using such techniques, the membrane is formed by cross-linking the copolymer. The preparation of copolymers is disclosed in Naciri et al, Room Temperature Ferroelectric Terpolymers with Large Spontaneous Polarization, Macromolecules, 1995, 28, 5274-5279, and Nacrici, et al, Liq. Cryst. 1991, 10 (4), 585, both incorporated herein in full by reference.

Figure 9:
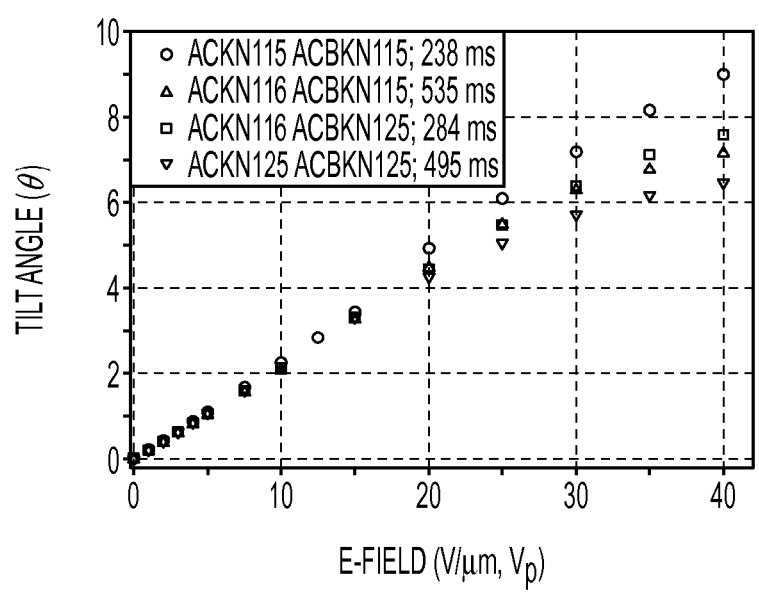
FIG. 9 is the tilt angle and response time measurements for elastomers containing different LC mixtures.

To prepare the anisotropic LCE film preparation, the optimal concentration for each component was determined from differential scanning calorimetry (DSC) measurements for each combination of monomer used. Determination of the phase behavior of the individual components allowed the eutectic point for the materials to be calculated in order to provide the lowest operating melting temperature and the largest temperature range in the smectic A (smA) phase. A large temperature range in the smA phase would provide the best opportunity to observe the highest molecular tilt angle, which would correspond to the greatest macroscopic shape changes when an external field was applied. Mixtures of mesogens are used to maximize the temperature range in the smA phase, however, those skilled in the art would understand that a single mesogenic unit can be used to synthesize the electroclinic elastomers. A shape changing membrane has been made using of a single compound. Those skilled in the art would understand the advantages of using a mixture of different mesogenic units in order to create an elastomer having properties, for example, tilt angle and response time, that are optimized for a given application. FIG. 9 shows the tilt angle and response time measurements for several liquid crystal mesogen mixtures. All data were taken from smectic A elastomer films in a 10 μm EHC cell at 40° C. The response time of each material at the maximum voltage tested (40 V/μm) is listed in the legend.

Figure 7:
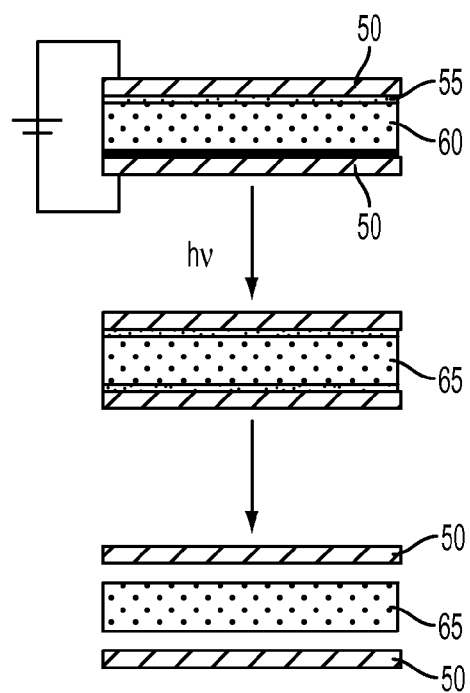
FIG. 7 is a schematic representation of the procedure used to align, cross-link. and extract the elastomer films.
Figure 8:
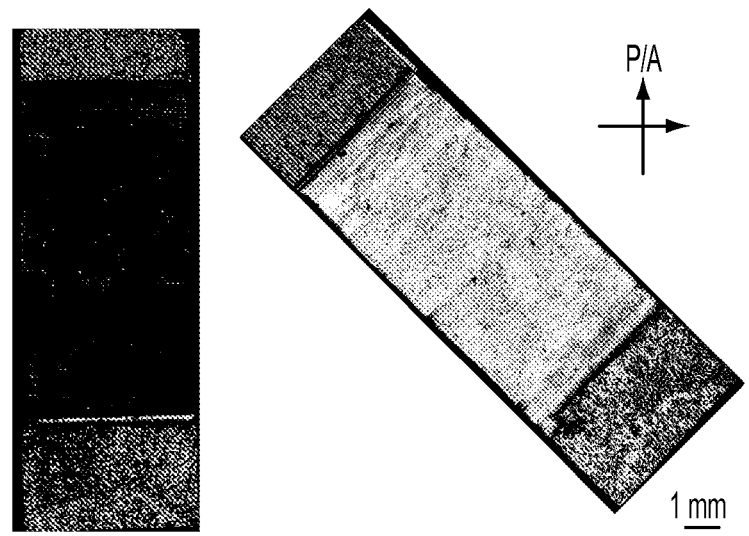
FIG. 8 is a 60 µm-thick film observed with polarized light microscopy.

Once the optimal concentration was determined for a combination of mesogenic units, the elastomers were prepared in the following way. Weight percentages of mesogens were measured and dissolved in dichloromethane. To this mixture was added 2.55 mol % of the cross-linking agent DACP11 and 2 weight % of the photo-initiator Lucirin TPO. The solvent w as removed from the mixture by heating and placing it under vacuum. FIG. 7 shows an overview of the processing of the mixture after solvent removal. Following evaporation, the mixture 60 was heated to the isotropic phase and drawn into indium-tin-oxide (ITO) glass cells 50 containing spacers of known thickness, which determined the smectic elastomer film thickness. The thickness attainable using this particular technique ranges from 10 to 100 microns. Two mechanically rubbed layers of poly-vinyl alcohol (PVA) and poly-imide 55 were included on the ITO glass surface 50 to provide planar alignment of the liquid crystal molecules. PVA provided a sacrificial layer that was dissolved in water for extraction of the elastomer film 65. Following filling, the sample was heated to the isotropic phase and slowly cooled through the isotropic to smectic A phase transition at 0.1°/min. During cooling an electric field of 6 V/μm (Vp) was applied in the form of a square wave at 0.5 Hz. The combined effect of cooling the sample and application of the electric field produced well-aligned samples with a planar texture. Following cooling, the e-field was removed and samples were polymerized/cross-linked by exposure to a UV light source. Free-standing films 65 were then extracted from the glass cells by dissolving the PVA 55 in water. The resulting elastomer films 65 displayed textures under polarized light microscopy which correspond to a smectic A phase with good alignment of the molecular director along the film axis. FIG. 8 shows a 60 mm-thick film observed with polarized light microscopy in two orientations. The upper part of the free-standing film is coated with insulating adhesive tape, while the lower portion of the film is an area not aligned with an electric field prior to photopolymerization. The middle portion of the LCE is the well-aligned region capable of macroscopic shape changes. The LCE film was placed between crossed polarizers at room temperature. The uniform birefringence observed upon rotating the sample to a 45° position with respect to the analyzer, shows that the molecules are well oriented along the film axis in the sample. Other well-known methods can be used to form these freestanding liquid crystal elastomers.

To gain an understanding of the potential strains produced by the electroclinic elastomers, optical tilt angle measurements were calculated based on a well-established technique [Lee and Patel, *App. Phys. Lett.*, 54, 1653, 1989] known to those skilled in the art. At fixed temperatures, the tilt angle and response time of elastomers films were measured by applying an electric field and monitoring the change in polarized light intensity. The change of intensity corresponds to the change in the tilt angle of the LC molecules. As expected, the molecular tilt angle and response time increased with decreasing temperature as the material approached the glassy transition, $T_g$, which was 28° C. as determined from DSC measurements. In the smectic A phase both the molecular tilt angle and response time are temperature dependant, a characteristic well documented for electroclinic materials. FIG. 9 displays the optical tilt angle induced upon application of an electric field at 40° C. of ELCE films cross-linked with 2.55 mol % DACP11 and composed of different mixtures of chiral smectic A molecules. The tilt angle and response time measurements for several LC molecule mixtures are shown. All data were taken from smectic A elastomer films in a 10 μm EHC cell at 40° C. The response time of each material at the maximum voltage tested (40 V/μm) is listed in the legend.

Having described the invention, the following examples are given as particular embodiments thereof and to demonstrate the practice and advantages thereof. It is understood that the examples are given by way of illustration and are not intended to limit the specification or the claims in any manner.

EXAMPLE 1

Figure 10:
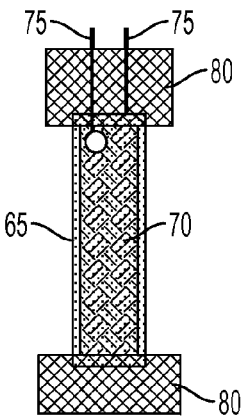
FIG. 10 is a schematic of film preparation used to study shape changes.

Free-standing electroclinic elastomers were prepared using the procedure described in section above. Actuation experiments were conducted on a dynamic mechanical analyzer (DMA 2980, TA Instruments) under isothermal conditions (35° C.). Silver Conductive Grease (Circuit Works) was coated on either side of elastomer films to act as electrodes during actuation tests. FIG. 10, is a schematic representation of LCE films 65 coated with conductive grease 70 with copper leads 75 positioned at one end of the film, which were insulated 80 and connected to a voltage source. Strain measurements were performed as a function of applied voltage under isostress (1 mN) conditions. ELCE response times for actuation tests were not determined from the DMA due to limitations of the equipment. The thickness of ELCE films were measured directly using a digital micrometer.

Figure 11A:
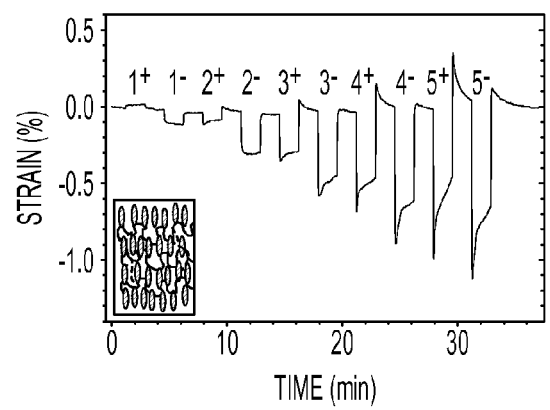
FIG. 11 is the macroscopic contractile response of the ELCE.
Figure 11B:
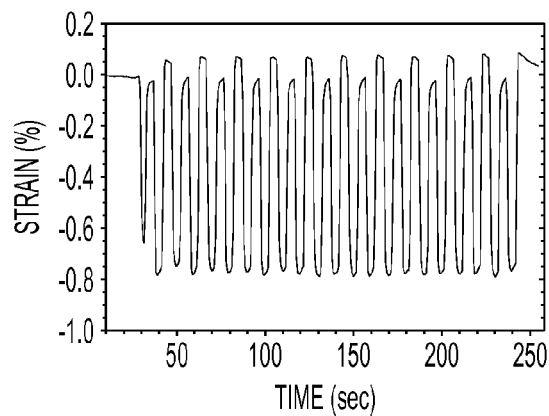

Samples of the elastomer film were cut in rectangular shapes and mounted in a tension clamp with the smectic layers either perpendicular or parallel to the long axis of the film. Elastomers mounted with the long axis of the film normal to smectic layers contracted when subjected to electric fields. The macroscopic contractile response of the ELCE are shown in FIG. 11. FIG. 11a shows the ELCE film mounted perpendicular to the smectic layers (see inset) demonstrating the contractile response as a function of the electric field strength. The 60-μm thick film was subjected to 100 second pulses of ±3.3, ±6.7, ±10, ±13.3, and ±16.7 V/μm for $1^{+/-}$, $2^{+/-}$, $3^{+/-}$, $4^{+/-}$, and $5^{+/-}$, respectively. FIG. 11b shows the reproducibility of electroclinic film subjected to 11 cycles of ±13.3 V/μm at 0.2 Hz demonstrating sustained −0.8% contraction during stimulus. Contractile strains approaching −1.0% were achieved by increasing the strength of the electric-field to ±16.7 V/μm. The magnitude of the observed contraction is directly related to smectic layer contraction by 1-cos θ (FIG. 1). The tilt direction switches with the polarity of the electric field, and in a perfectly aligned sample the effect on the contractile response should be independent of the tilt direction. However, nearly all films tested displayed a small bias in the contractile response of the film (FIG. 11a), which may be due to slight misalignment of samples on the DMA or possibly the result of the low frequency electric field used to align the sample (which was removed prior to photopolymerization). Some films also displayed a small extension at very low voltages to one sense of the voltage (pulse $1^+$, FIG. 11a), which was often reduced or disappeared following repeated actuation. At higher field strengths a spike in the contractile strain was often followed by decay toward an equilibrium value, which matches well with the expected strain calculated from the molecular tilt angle in electrooptic measurements. The observed decay may be the discharging of the electrodes by the migration of ionic impurities resulting in a lower effective voltage, a well known phenomenon in liquid crystal cells driven at low frequencies or DC fields.

Actuation was also monitored at various frequencies under constant electric field strength. Remarkably, the contraction of the elastomer is reproducible with no damping of the response when subjected to repeated cycles of alternating electric fields. As shown in FIG. 11b, the smectic elastomer is able to sustain repeated 5 second actuation cycles of ±13.3 V/μm with a strain of 0.80±0.05%, consistent with the magnitude of the strain observed in pulses $4^{+/-}$ in FIG. 11a. Higher frequency responses could not be reliably captured on the mechanical analyzer, but we have visually observed actuation in the free-standing films at frequencies as high as 20 Hz.

EXAMPLE 2

Figure 12A:
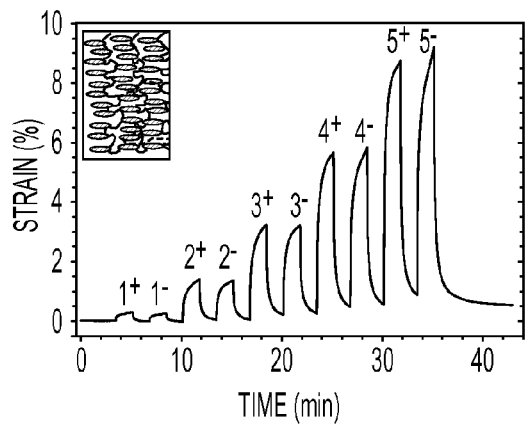
FIG. 12 is the macroscopic elongation response of the ELCE.
Figure 12B:
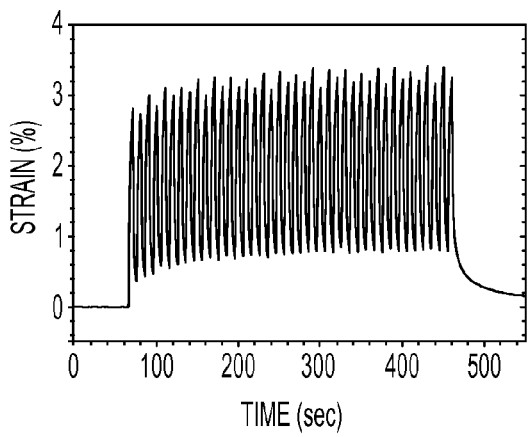

Elastomer samples mounted parallel to the smectic layers exhibited large extension strains due to shear, as shown in FIG. 12, and the response was dependent on the magnitude of the e-field. There was negligible bias in the response of the material to positive and negative electric fields over 100 sec intervals. The sample tested in FIG. 11 was cut from the same elastomer film. Assuming negligible change in the thickness of the elastomer films, the extension observed in the direction parallel to the layers will have a sin θ dependence (FIG. 1). Notably, the strain response of the material is in reasonable agreement with this relation based solely on the molecular tilt (FIG. 9). Under the largest field applied in FIG. 12a (±16.7 V/μm) the observed strain under both positive and negative electric fields is ~8.2% whereas the expected strain is 10%. Just as with the films mounted in the perpendicular orientation, frequency tests were performed to demonstrate the repeatability of the actuation response. FIG. 12b displays the response of the elastomers subjected to 5 second cycles of ±13.3 V/μm and demonstrates 2.48±0.09% extension which is much smaller than the maximum value of ~5.8% observed after 100 s interval (pulses $4^{+,-}$ FIG. 12a). The strain production of the material in this orientation is mainly due to the relatively slow reorientation of the polymer backbone in response to the induced molecular tilt, thus accounting for the lower strains observed at higher testing frequencies. As the strain response relates to the stress produced by the material, it is important to note that stress applied normal to the smectic layers is opposed by strong van der Waal's interactions between the aromatic cores of the mesogens and inhibits extension of the elastomer, while stress applied along the smectic layers causes the relatively compliant polymer backbone to elongate with much less resistance. Overall, these results demonstrate the reproducibility of the strain response and the ability of the free-standing films to withstand relatively large electric fields at low frequencies.

EXAMPLE 3

Figure 13A:
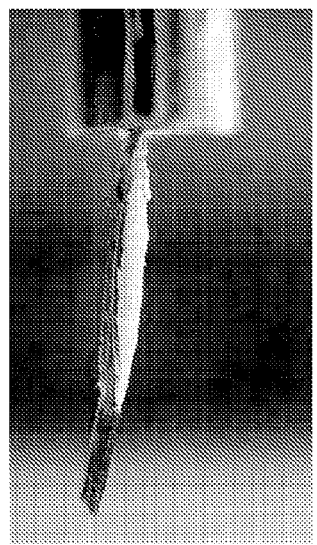
FIG. 13 displays the actuation response of a free-standing elastomer film.
Figure 13B:
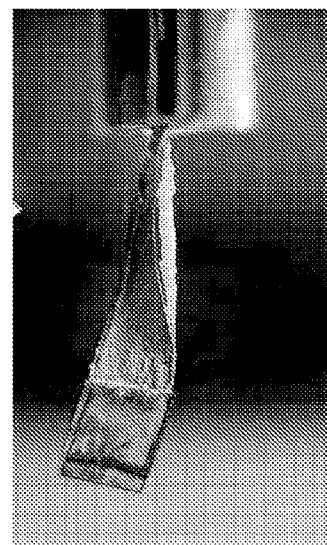

Macroscopic shape changes of the free-standing elastomer films were also visually observed. Rectangular pieces of film cut with the long axis in the direction of the molecular alignment were approximately 2 mm wide and 10 mm long. Films were prepared for actuation tests in a manner similar to the one described in FIG. 10. The electrode was a thin layer of electrical conductive grease (Silver Conductive Grease, Circuit Works). Those skilled in the art would understand that the conductive grease that acts as an electrode on the film could be substituted with other conductive materials such as gold for example. The wire leads were connected to a high voltage amplifier, which was connected to a function generator. The electroclinic effect is temperature dependant and for this particular sample the optimal operating temperature that provides the largest strain and fastest response is between 30 and 35° C. Therefore, the mounted film was positioned in a temperature controlled apparatus for duration of testing. Actuation of the films was accomplished by applying sinusoidal, square and triangle waveforms at frequencies ranging from 0.1 to 20 Hz and voltages ranging between 0 to ±20 V/μm. In addition, a DC offset was applied to hold the actuated film in a fixed position at varying voltages. Actuation of the films was accompanied with a macroscopic torque or twist of the film from the initial resting position. An example of the actuation is shown in the side view images of the film in FIG. 13. In this particular experiment, application of +16 V/μm resulted in a counter-clockwise rotation of the film (FIG. 13b).

The conducting grease, and hence the electric field, was applied across the central region of the film to prevent a short circuit when a voltage is applied across the film surface. As a result, there is a competition between the central section, which will contract, and the outer edge, which will not undergo deformation because of the lack of the electrode material on it. This leads to a parallelogram distortion. To resolve this competition, the film twists into the third dimension, giving the shape shown in FIG. 13b. In this case, the twisted shape depends on the sign of the applied electric field. Switching the sign of the field gives the opposite sense of the twist. This dependence of shape on the sign of the field is characteristic of the electroclinic effect. It contrasts with the behavior of nematic elastomers, which have equivalent responses to electric fields of either sign.

Overall free-standing electroclinic elastomer films have been created and application of an electric field causes the ELCE films to contract normal to the layers and extend in the orthogonal direction. Recent x-ray scattering of films in the presence of an applied field confirm the molecular tilt and resulting layer contraction (data not shown). Preliminary isostrain studies reveal contractile and tensile stresses of up to 20 kPa in films actuated in either orientation. Since the magnitude of the stress is strongly dependent on the amount of cross-linker and its incorporation into the elastomer network, future work will focus on confinement of cross-linking agents to either the interlayer region of the smectic elastomer or spanning across the layers.

Obviously, many modifications and variations of the present invention are possible in light of the above teachings. It is therefore to be understood that, within the scope of the appended claims, the invention may be practiced otherwise than as specifically described.

What is claimed as new and desired to be protected by Letters Patent of the United States is:

1. A shape changing membrane comprising:
    at least one liquid crystal elastomer film, said elastomer film having a chiral smectic A phase and a planar orientation; and
    at least one stimuli, said stimuli being operable on said film.

2. The membrane of claim 1 wherein said liquid crystal elastomer film is comprised of:
    at least one liquid crystal mesogen comprising a polymerizable group and a flexible spacer; and
    a crosslinker.

3. The membrane of claim 1 wherein said liquid crystal elastomer film is comprised of:
    a first liquid crystal mesogen comprising a polymerizable group and a flexible spacer;
    a second liquid crystal mesogen comprising a polymerizable group and a flexible spacer, wherein said first and said second liquid crystal mesogens are different; and
    a crosslinker.

4. The membrane of claim 3 wherein said first liquid crystal mesogen has the formula:

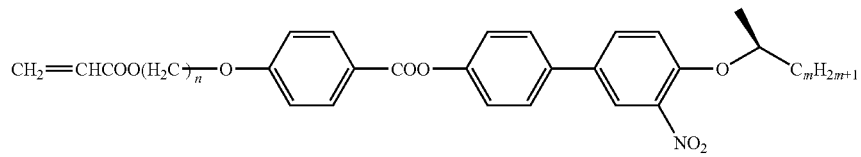

wherein n is from 4 to 12 and m is from 5 to 6.

5. The membrane of claim 3 wherein said second liquid crystal mesogen has the formula:

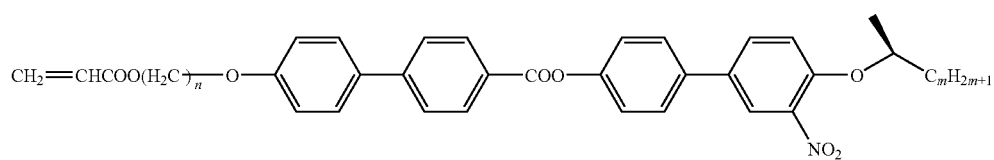

wherein n is from 4 to 12 and m is from 5 to 6.

6. The membrane of claim 3 wherein said crosslinker has the formula:

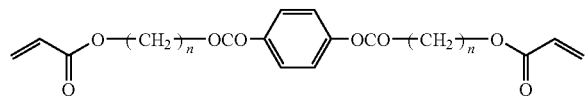

wherein n is from 4 to 14.

7. The membrane of claim 1 wherein said stimuli is electrical or thermal.

8. The membrane of claim 1 wherein said stimuli comprises at least two electrodes in contact with said film.

9. The membrane of claim 8 wherein said stimuli comprises a patterned array of electrodes.

10. The membrane of claim 1 wherein said liquid crystal elastomer film ranges from about 100 nm to about 200 microns thick.

11. The membrane of claim 10 wherein said liquid crystal elastomer film more preferably ranges from about 10 microns to about 100 microns thick.

12. The membrane of claim 2 wherein said polymizable group forms a polymer backbone.

13. The membrane of claim 12 wherein said polymer backbone is a polyacrylate, polysiloxane or polynorbornene backbone.

14. A shape changing membrane comprising:
at least one first liquid crystal elastomer film layer having a chiral smectic A phase and a planar orientation;
at least one second liquid crystal elastomer film layer having a chiral smectic A phase and a planar orientation, said first elastomer film layer being oriented perpendicularly to said second elastomer film layer; and
a first patterned electrode layer, wherein said first elastomer film layer is separated from said second elastomer film layer by a patterned electrode layer;
a second patterned electrode layer located on top of and in contact with said first elastomer layer; and
a third patterned electrode layer located under and in contact with said second elastomer layer.

15. The membrane of claim 14 wherein said liquid crystal elastomer films are comprised of:
a first liquid crystal mesogen comprising a polymerizable group and a flexible spacer;
a second liquid crystal mesogen comprising a polymerizable group and a flexible spacer, wherein said first and said second liquid crystal mesogens are different; and
a crosslinker.

16. The membrane of claim 15 wherein said first liquid crystal mesogen has the formula:

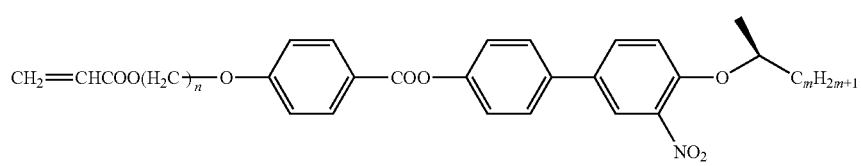

wherein n is from 4 to 12 and m is from 5 to 6.

17. The membrane of claim 15 wherein said second liquid crystal mesogen has the formula:

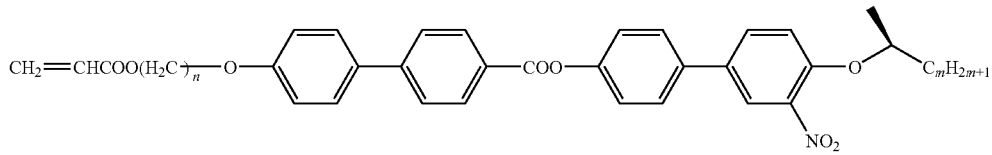

wherein n is from 4 to 12 and m is from 5 to 6.

18. The membrane of claim 15 wherein said crosslinker has the formula:

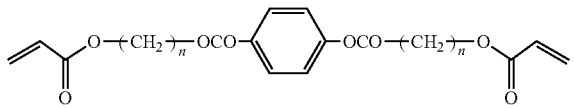

wherein n is from 4 to 14.

19. The membrane of claim 14 wherein said first and said second liquid crystal elastomer films range from about 100 nm to about 200 microns thick.

20. The membrane of claim 14 wherein said first and said second liquid crystal elastomer film more preferably ranges from about 10 microns to about 100 microns thick.

21. The membrane of claim 15 wherein said polymizable group forms a polymer backbone.

22. The membrane of claim 21 wherein said polymer backbone is a polyacrylate, polysiloxane or polynorbornene backbone.

23. A method of making a shape changing membrane comprising:
   combining a first liquid crystal mesogen comprising a polymerizable group and a flexible spacer, a second liquid crystal mesogen comprising a polymerizable group and a flexible spacer, and a crosslinker to form a mixture;
   adding a polymerization catalyst to said mixture;
   aligning said mixture in a planar alignment;
   polymerizing said mixture; and
   forming said membrane.

24. The method of claim 23 wherein said first liquid crystal mesogen has the formula:

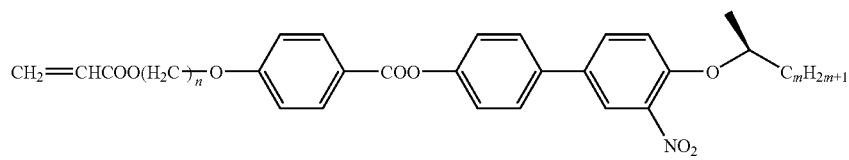

wherein n is from 4 to 12 and m is from 5 to 6.

25. The method of claim 23 wherein said second liquid crystal mesogen has the formula:

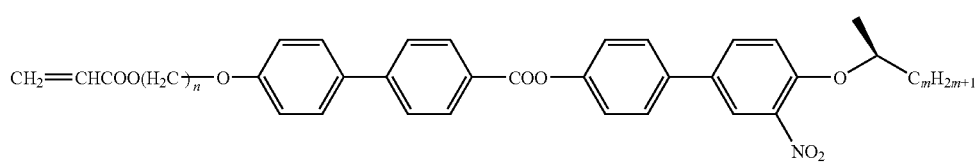

wherein n is from 4 to 12 and m is from 5 to 6.

26. The method of claim 23 wherein said crosslinker has the formula:

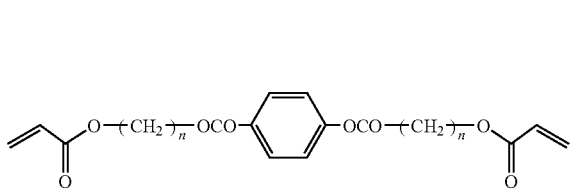

wherein n is from 4 to 14.

27. The membrane of claim 23 wherein said polymizable group forms a polymer backbone.

28. The membrane of claim 27 wherein said polymer backbone is a polyacrylate, polysiloxane or polynorbornene backbone.

29. The method of claim 23 wherein said polymerization catalyst is a photo-initiator or a thermal-initiator.

30. The method of claim 23 wherein said combining occurs in solvent.

31. The method of claim 30 further comprising evaporating said solvent after said polymerization.

32. A method of making a shape changing membrane comprising:
    forming at least one copolymer comprising a polymer backbone having a liquid crystal mesogen side chain and a cross-linker side chain with a polymerizable group;
    adding a polymerization catalyst to said copolymer;
    aligning said copolymer in a planar alignment;
    cross-linking said copolymer; and
    forming said membrane.

33. The method of claim 32 wherein said liquid crystal mesogen has the formula:

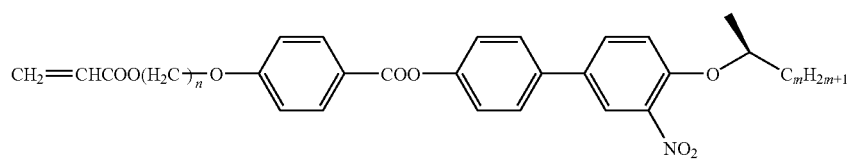

wherein n is from 4 to 12 and m is from 5 to 6.

34. The method of claim 32 wherein said crosslinker has the formula:

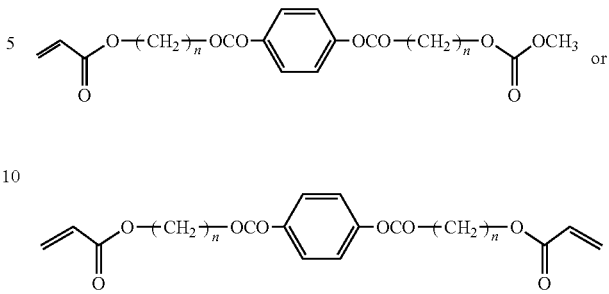

wherein n is from 4 to 14.

35. The method of claim 32 wherein said polymer backbone is a polyacrylate, a polysiloxane or a polynorbornene backbone.

36. The method of claim 32 wherein said polymerization catalyst is a photo-initiator.

37. A method of making a shape changing membrane comprising:
    forming at least one terpolymer comprising a polymer backbone having a first liquid crystal mesogen side chain, a second liquid crystal mesogen side chain, and a cross-linker side chain with a polymerizable group;
    adding a polymerization catalyst to said terpolymer;
    aligning said mixture in a planar alignment,
    cross-linking said terpolymer; and
    forming said membrane.

38. The method of claim 37 wherein said first liquid crystal mesogen has the formula:

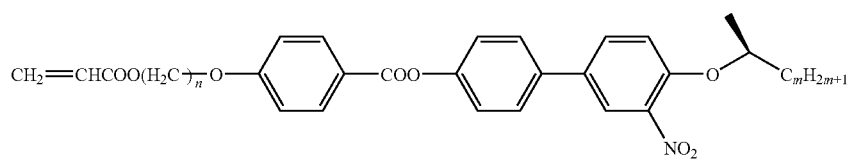

wherein n is from 4 to 12 and m is from 5 to 6.

39. The method of claim 37 wherein said second liquid crystal mesogen has the formula:

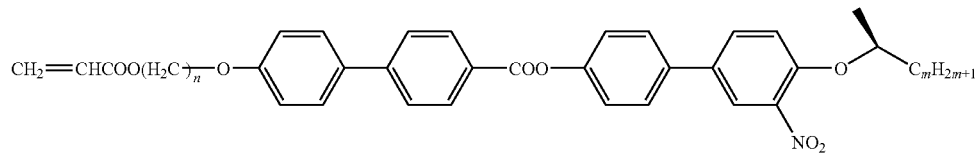

wherein n is from 4 to 12 and m is from 5 to 6.

40. The method of claim 37 wherein said crosslinker has the formula:

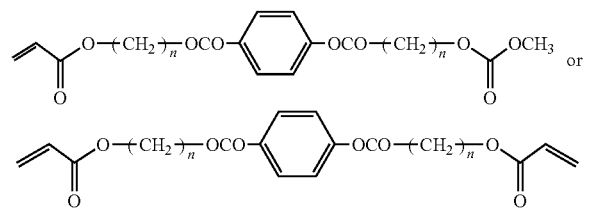

wherein n is from 4 to 14.

41. The method of claim 37 wherein said polymer backbone is a polyacrylate, a polysiloxane, or a polynorbornene backbone.

42. The method of claim 37 wherein said polymerization catalyst is a photo-initiator.

* * * * *

UNITED STATES PATENT AND TRADEMARK OFFICE
CERTIFICATE OF CORRECTION

PATENT NO. : 7,628,935 B2
APPLICATION NO. : 11/553305
DATED : December 8, 2009
INVENTOR(S) : Naciri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 196 days.

Signed and Sealed this

Second Day of November, 2010

David J. Kappos
*Director of the United States Patent and Trademark Office*